(12) United States Patent
Bonaccio et al.

(10) Patent No.: US 7,287,177 B2
(45) Date of Patent: Oct. 23, 2007

(54) DIGITAL RELIABILITY MONITOR HAVING AUTONOMIC REPAIR AND NOTIFICATION CAPABILITY

(75) Inventors: Anthony R. Bonaccio, Shelburne, VT (US); Michael LeStrange, South Burlington, VT (US); William R. Tonti, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/729,751

(22) Filed: Dec. 4, 2003

(65) Prior Publication Data

US 2005/0125707 A1 Jun. 9, 2005

(51) Int. Cl.
*G06F 1/04* (2006.01)
*G07C 3/04* (2006.01)

(52) U.S. Cl. ......................... 713/502; 377/16
(58) Field of Classification Search ................ 713/502; 377/16
See application file for complete search history.

(56) References Cited

U.S. PATENT DOCUMENTS

| | | | |
|---|---|---|---|
| 4,563,897 A | 1/1986 | Moore | |
| 5,334,826 A | 8/1994 | Sato et al. | |
| 5,420,571 A | 5/1995 | Coleman et al. | |
| 5,459,342 A * | 10/1995 | Nogami et al. | 257/209 |
| 5,654,896 A * | 8/1997 | Ochi | 716/4 |
| 5,688,232 A * | 11/1997 | Flower | 604/20 |
| 5,771,420 A | 6/1998 | Suzuki et al. | |
| 5,878,201 A | 3/1999 | Onishi | |
| 5,983,369 A | 11/1999 | Bakoglu et al. | |
| 6,098,182 A | 8/2000 | Cowan | |
| 6,153,450 A * | 11/2000 | Deguchi | 438/130 |
| 6,425,092 B1 * | 7/2002 | Evans et al. | 714/13 |
| 6,577,156 B2 * | 6/2003 | Anand et al. | 326/37 |
| 6,586,961 B2 * | 7/2003 | Chaisemartin | 326/10 |
| 6,812,557 B2 * | 11/2004 | Matsuo et al. | 257/686 |
| 6,814,296 B2 * | 11/2004 | Angle et al. | 235/492 |
| 6,861,865 B1 * | 3/2005 | Carlson | 326/10 |
| 6,993,446 B2 * | 1/2006 | Gunawardana et al. | 702/117 |
| 2002/0174384 A1 | 11/2002 | Graichen et al. | |
| 2003/0034995 A1 | 2/2003 | Osborn et al. | |
| 2003/0110407 A1 | 6/2003 | Maeda | |
| 2003/0133720 A1 | 7/2003 | Siegel et al. | |
| 2003/0139982 A1 | 7/2003 | Schwartz et al. | |

FOREIGN PATENT DOCUMENTS

EP 204588 A2 * 12/1986

* cited by examiner

*Primary Examiner*—Thomas Lee
*Assistant Examiner*—Ji H Bae
(74) *Attorney, Agent, or Firm*—Schmeiser, Olsen & Watts; William H. Steinberg

(57) ABSTRACT

An integrated circuit, including: a pulse generator adapted to generate a pulsed signal; a cycle counter adapted to count cycles of the pulsed signal; one or more repairable circuit elements; and a repair processor adapted to repair a repairable circuit element when the cycle counter reaches a pre-determined cycle count.

36 Claims, 8 Drawing Sheets

DIGITAL RELIABILITY MONITOR HAVING AUTONOMIC REPAIR AND NOTIFICATION CAPABILITY

FIELD OF THE INVENTION

The present invention relates to the field of fault tolerance in integrated circuits; more specifically, it is directed toward a circuit structure and method for repairing integrated circuit elements prior to failure, and a method of designing an integrated circuit with autonomic repair capability.

BACKGROUND OF THE INVENTION

As the frequency performance of integrated circuits continues to increase, the rate of certain failure mechanisms increases in proportion to operating frequency, thereby reducing the time over which an integrated circuit can be expected to reliably perform. Such degradations in reliability caused by technology features needed to improve performance are difficult to compensate for with current integrated circuit design techniques. Therefore, a structure and method for mitigating the probability of early failures due to increased operating frequency is needed.

SUMMARY OF THE INVENTION

A first aspect of the present invention is an integrated circuit, comprising: a pulse generator adapted to generate a pulsed signal; a cycle counter adapted to count cycles of the pulsed signal; one or more repairable circuit elements; and a repair processor adapted to repair a repairable circuit element when the cycle counter reaches a pre-determined cycle count.

A second aspect of the present invention is a method of preemptively repairing an integrated circuit, comprising: (a) providing a pulse generator adapted to generate a pulsed signal; (b) providing a cycle counter adapted to count cycles of the pulsed signal; (c) providing one or more repairable circuit elements; and (d) providing a repair processor adapted to repair a repairable circuit element when the cycle counter reaches a pre-determined cycle count.

A third aspect of the present invention is a method for designing a repairable integrated circuit, comprising: generating an integrated circuit design from a design library of circuit elements; simulating the integrated circuit design and generating a switching report for circuit elements of the integrated circuit design; selecting a circuit element responsive to a pulsed signal of the integrated circuit design based on the switching report; selecting a repairable circuit element from the design library, the repairable circuit element having the same function as the selected circuit element and allowing multiple connection paths; and inserting the selected repairable circuit element, a cycle counter adapted to count cycles of the pulsed signal and repair processor adapted to repair the repairable circuit element when the cycle counter reaches a pre-determined value into the integrated circuit design.

A fourth aspect of the present invention is a computer system comprising a processor, an address/data bus coupled to the processor, and a computer-readable memory unit adapted to be coupled to the processor, the memory unit containing instructions that when executed by the processor implement a method for a method for designing a repairable integrated circuit, the method comprising the computer implemented steps of: generating an integrated circuit design from a design library of circuit elements; simulating the integrated circuit design and generating a switching report for circuit elements of the integrated circuit design; selecting a circuit element responsive to a pulsed signal of the integrated circuit design based on the switching report; selecting a repairable circuit element from the design library, the repairable circuit element having the same function as the selected circuit element and allowing multiple connection paths; and inserting the selected repairable circuit element, a cycle counter adapted to count cycles of the pulsed signal and repair processor adapted to repair the repairable circuit element when the cycle counter reaches a pre-determined value into the integrated circuit design.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
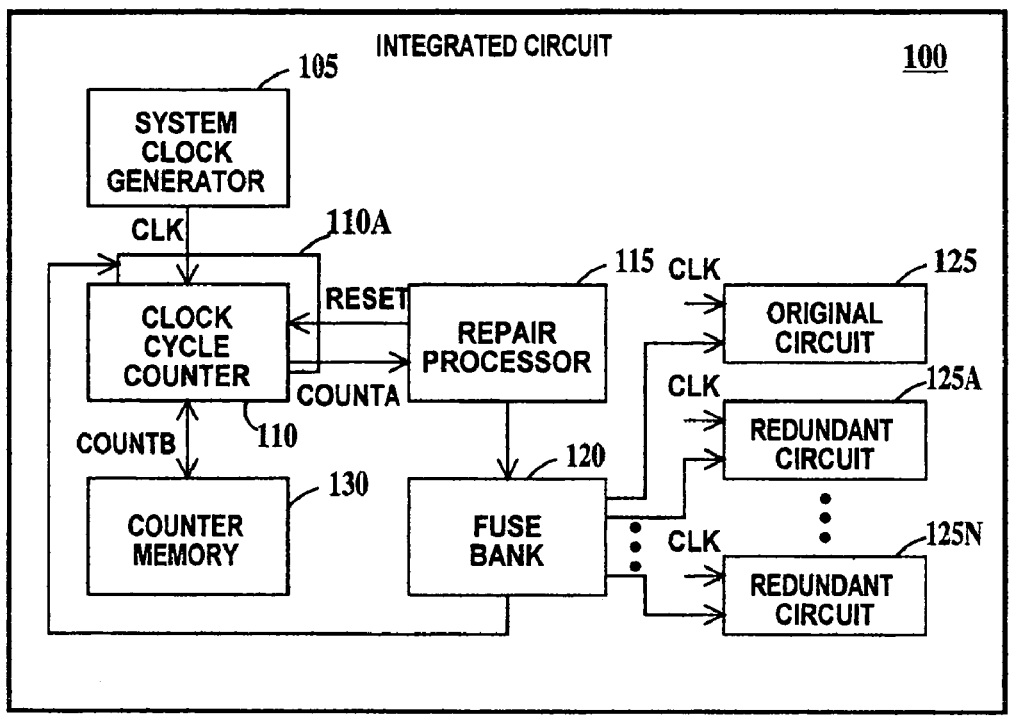
FIG. 1 is a schematic block diagram of an integrated circuit according to a first embodiment of the present invention.

For the purposes of the present invention, the terms integrated circuit and integrated circuit chip are interchangeable. A repair is defined as the replacement of a circuit element by a circuit element of the same function. A circuit element is defined as digital or analog circuit, a memory circuit, a latch, a group of logic gates, a logic gate or a device (such a transistor, a diode, a resistor, a capacitor, an inductor or a wire). A repair is further defined to include adjustment of a circuit element such that an attribute of an output of that circuit element is changed in magnitude.

A signal cycle is defined as the sum of: the time the signal is maintained at a first state, the time required for the signal to transition to a second state from the first state, the time the signal is maintained at the second state and the time required for the signal to transition from the second state back to the first state. Cycles may thus be counted by counting every other transition of the signal state. A clock signal is a special type of pulsed signal. For a clock signal, the cycle is uniformly periodic. Although the present invention is described using clock cycles, it is equally applicable to other types of cyclic or pulsed signals, such as encoded, multiplexed or modulated digital signals.

For a given process technology statistical analysis shows that an integrated circuit element may be expected to reliably transition a finite number of times prior to failure. A number of environmental factors and electrical characteristics of the integrated circuit contribute to this statistical analysis. For example, hot electron injection can stress the gate dielectric of the transistor each time the transistor is switched. The cumulative effect of many switching cycles may ultimately lead to transistor failure. Another example is a failure caused by electro-migration in the interconnect structure of an integrated circuit. At higher frequencies, more current is carried per unit time than at lower frequencies, causing the local current densities of chip interconnect structures to increase dramatically. While most prevalent in metallic structures, this phenomenon may also occur in heavily doped semiconductors. Current crowding in an isolated area may cause voids or stems to form in the circuit material resulting in open or short circuits. The electro-migration process will accelerate with the accompanying increase in temperature. These types of circuit failures and their respective probabilities can be related to system clock cycles.

In a simple example, given a microprocessor lifetime of 27.77 K power on hours (Kpoh) and a latch within the microprocessor operating at 1 GHz, the total clock cycles over the useful life of the chip equates to 100E15. It is determined that during each clock cycle the latch degrades at the rate of 1E-15% per clock cycle at a given $V_{DD}$ power level. With a specification set at 10% margin at 25 Kpoh, the reliable life of the latch is 90E15 clock cycles. Thus, a circuit tracking clock cycles can generate a notification to adjust a circuit element or replace a circuit element with a corresponding spare circuit element preemptively, that is, before actual failure occurs.

FIG. 1 is a schematic block diagram of an integrated circuit according to a first embodiment of the present invention. In FIG. 1, an integrated circuit chip 100 includes a system clock generator 105, a clock cycle counter 110, a redundant clock cycle counter 110A, a repair processor 115, an optional fuse bank 120, an original circuit 125 and a multiple of redundant circuits 125A through 125N, each redundant circuit capable of performing the same function as the original circuit. There may be only one redundant circuit. Additionally, integrated circuit 100 may include an on-chip count memory 130 for storing the cumulated number of cycles counted by clock cycle counter 110. Alternatively, the count memory 130 may be implemented off-chip.

System clock generator (which may be a PLL circuit) generates a clock signal CLK supplied to original circuit 125 and a multiple of redundant circuits 125A through 125N and to clock cycle counter 110. Clock cycle counter 110 keeps a running tally of the number of clock cycles that have occurred since the last power up after the last clock cycle counter RESET signal. A RESET signal is generated by repair processor 115 in response to a COUNTA signal sent from the clock cycle counter 110 and received by repair processor 115 that triggered a repair event. Repair processor 115 has the capability of performing all the tasks and generating all the signals required to affect a circuit repair. The current clock cycle count COUNTB, is stored in counter memory 130. Since COUNTB should be resumed at power up, counter memory 130 should be a non-volatile type memory such as non-volatile random access memory (NVRAM), which will save the value of COUNTB when the chip is powered down. Clock cycle counter 110 has the capability of restoring its count prior to a power down at a subsequent power up and continue counting clock cycle count from the restored count.

The first time repair processor receives a COUNTA triggering a replacement, original circuit 125 is replaced by redundant circuit 125A. RESET signal is then generated causing cycle clock counter 110 to reset its count to zero clock cycles. The next time COUNTA reaches a value that triggers a replacement, redundant circuit 125A is replaced by a subsequent redundant circuit in the set of redundant circuits 125A through 125N. COUNTA and COUNT B may be the same signal, or different signals as discussed infra. Repair processor 115 may affect replacement directly or by electrically blowing fuses in fuse bank 120, the pattern created by the states of the fuses directing inputs and outputs of the replaced circuit and the replacement circuit as required. However, any method of affecting repair may be used, including methods requiring the off chip storage of the current repair status of integrated circuit 100, so it can be restored at power up.

Figure 2:
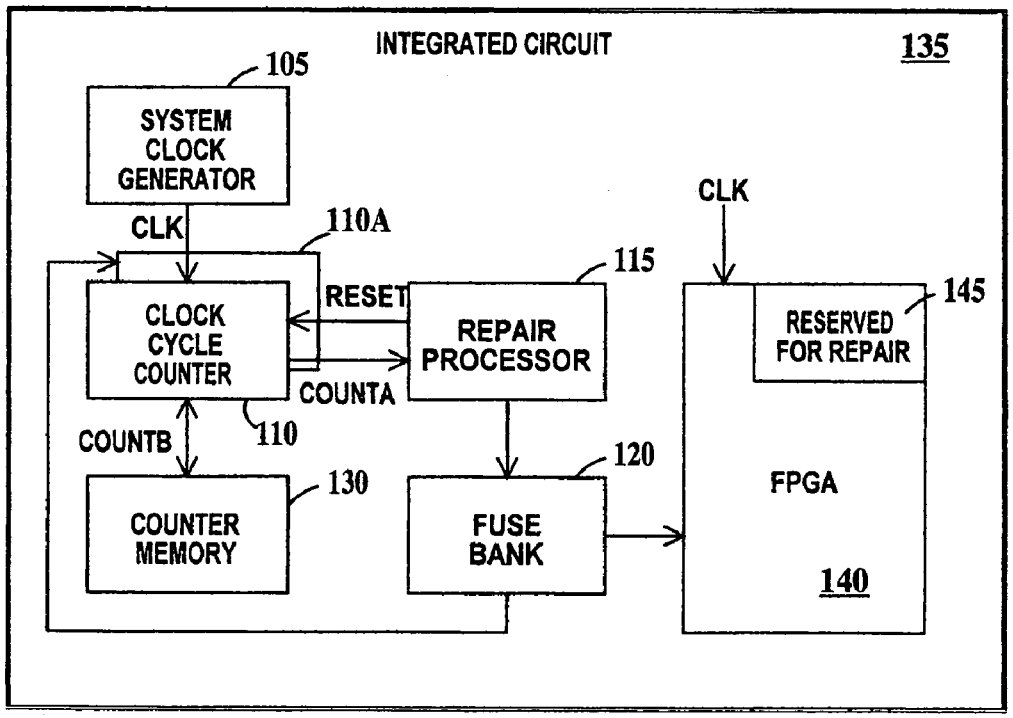
FIG. 2 is a schematic block diagram of an integrated circuit according to a second embodiment of the present invention.

It should be noted, that clock cycle counter 110 may be repairable using the present invention. To this end, repair processor 115 can automatically insert redundant clock cycle counter 110A between system clock generator 105, memory counter 130 and the repair processor itself in place of clock cycle counter 110 when a predetermined number of clock cycles are reached. This pre-determined number of clock cycles should be significantly less than the COUNTA signal value. More than one redundant clock cycle counter may be provided and this process may be repeated as many times as there are redundant repair processors FIG. 2 is a schematic block diagram of an integrated circuit according to a second embodiment of the present invention. In FIG. 2, integrated circuit 135 is similar to integrated circuit 100 of FIG. 1, except original circuit 125 and redundant circuits 125A through 125N of FIG. 1 are replaced with a field programmable gate array (FPGA) 140. A portion 145 of FPGA 140 is reserved for use as replacement gates to form a replacement circuit for a function performed by FPGA 140.

In the simplest approach, COUNTA and COUNTB are conveyed by buses between clock cycle generator 110 and repair processor 115 and between clock cycle counter 110 and counter memory 130 that are as wide as an internal counter within the clock cycle counter. However, a simple calculation shows that this approach requires a large number of wires, especially when multiple repair processors are distributed around the integrated circuit. For example, given a 10 GHz clock frequency and 10 years of power on operation requires a counter capable of counting 3.16E18 clock cycles. The base 2 log of 3.16E18 is 62, so a 62-bit counter is required as well as a 62-bit bus. Reducing the operating frequency to 1.25 GHz only reduces the counter to 58-bits. A way of reducing the bus width and the associated circuit complexity is to employ most significant bit (MSB) sampling in the repair processor. This approach is illustrated in FIGS. 3 and 4 and described infra.

Figure 3:
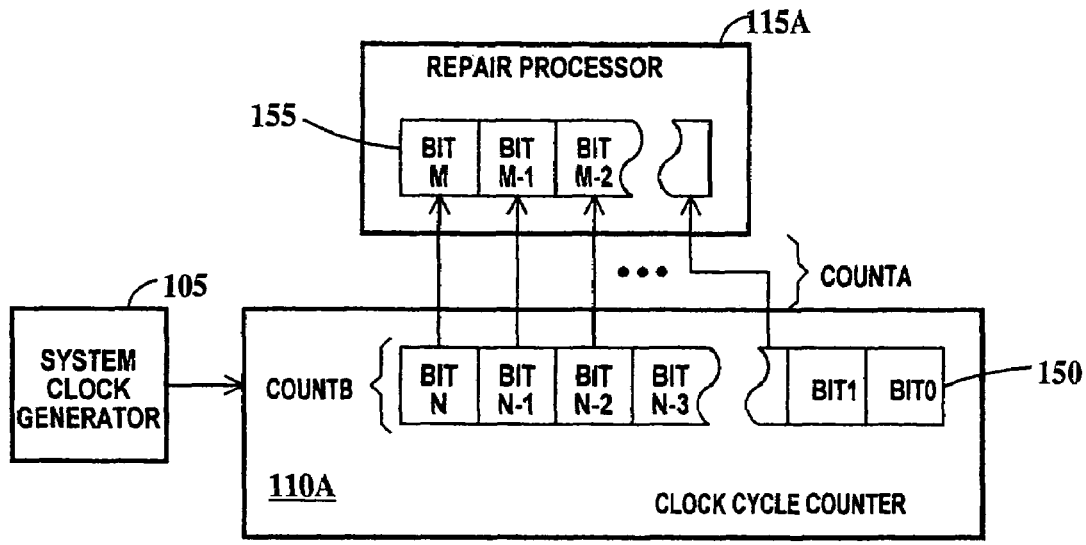
FIG. 3 is a diagram illustrating a first circuit implementation of the present invention.

FIG. 3 is a diagram illustrating a first circuit implementation of the clock cycle counter, repair processor and system clock generator components disclosed in the present invention. In FIG. 3, a clock cycle counter 110A includes an N+1 bit register 150, which holds the current value of COUNTB. Register 150 is sized to hold the maximum number of clock cycles to be counted. A repair processor 115A includes an M+1 bit register 155, which holds the current value of COUNTA. The last M-bits in register 150 are connected to corresponding bit positions in register 155. M can be much smaller than N since repair processor 115A does not need to known the exact clock cycle count but only what fraction of the maximum value of COUNTB has been reached. For example, if M=3 and the bits in register 155 are 0 0 0 1, then 1/16 of the maximum number of clock cycles has been reached. When the bits in register 155 are 1 0 0 0 then 1/2 of the maximum number of clock cycles has been reached. Repair processor 115A can either be designed to react to any single bit of the M-bits of register 155 toggling, or to a pattern of all M-bits. Thus, only an M-bit wide bus is required. The particular set of M-bits selected from register 150 need not include the highest bits.

Figure 4:
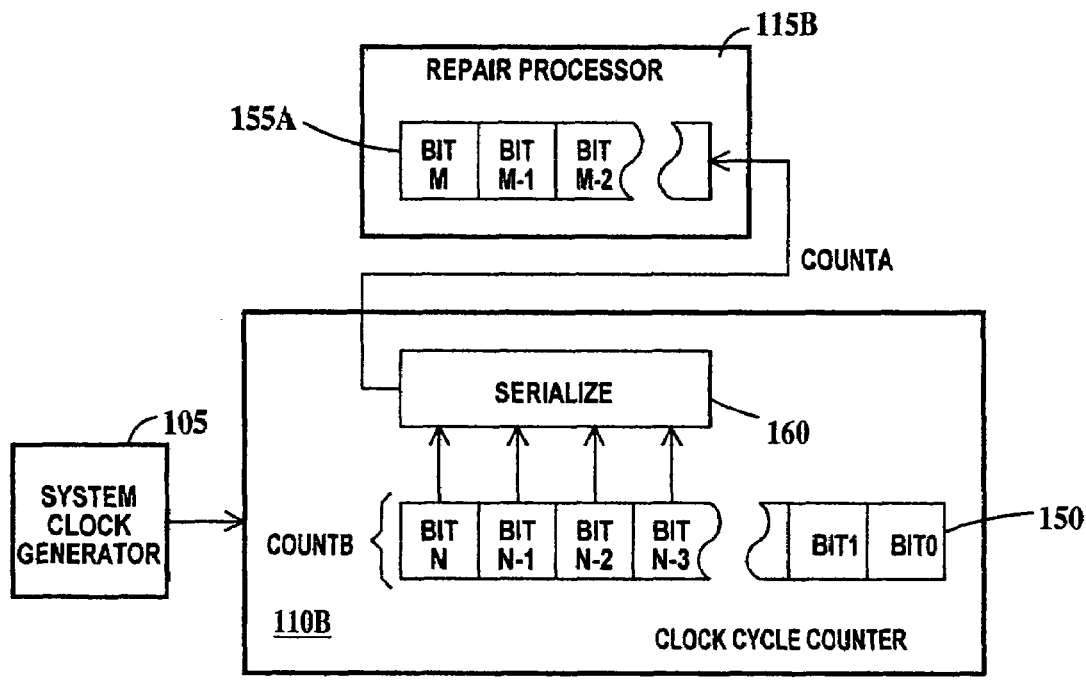
FIG. 4 is a diagram illustrating a second circuit implementation of the present invention.

FIG. 4 is a diagram illustrating a second circuit implementation of the clock cycle counter, repair processor and system clock generator disclosed in the present invention. In FIG. 4, a clock cycle counter 110B is similar to clock cycle counter 110A of FIG. 3 except for the addition of a serialization circuit 160, which takes the M-bits and generates a coded digital signal (COUNTA) that can be distributed by a single wire. Also, a repair processor 115B is similar to repair processor 115A of FIG. 3, except for register 155A being a shift register.

The approach to serialization of COUNTA can be expanded to serialize COUNTB in order to avoid the need for a multi-wire bus between clock cycle counter 110 and counter memory 130, particularly in the case when the counter memory is off-chip.

Figure 5:
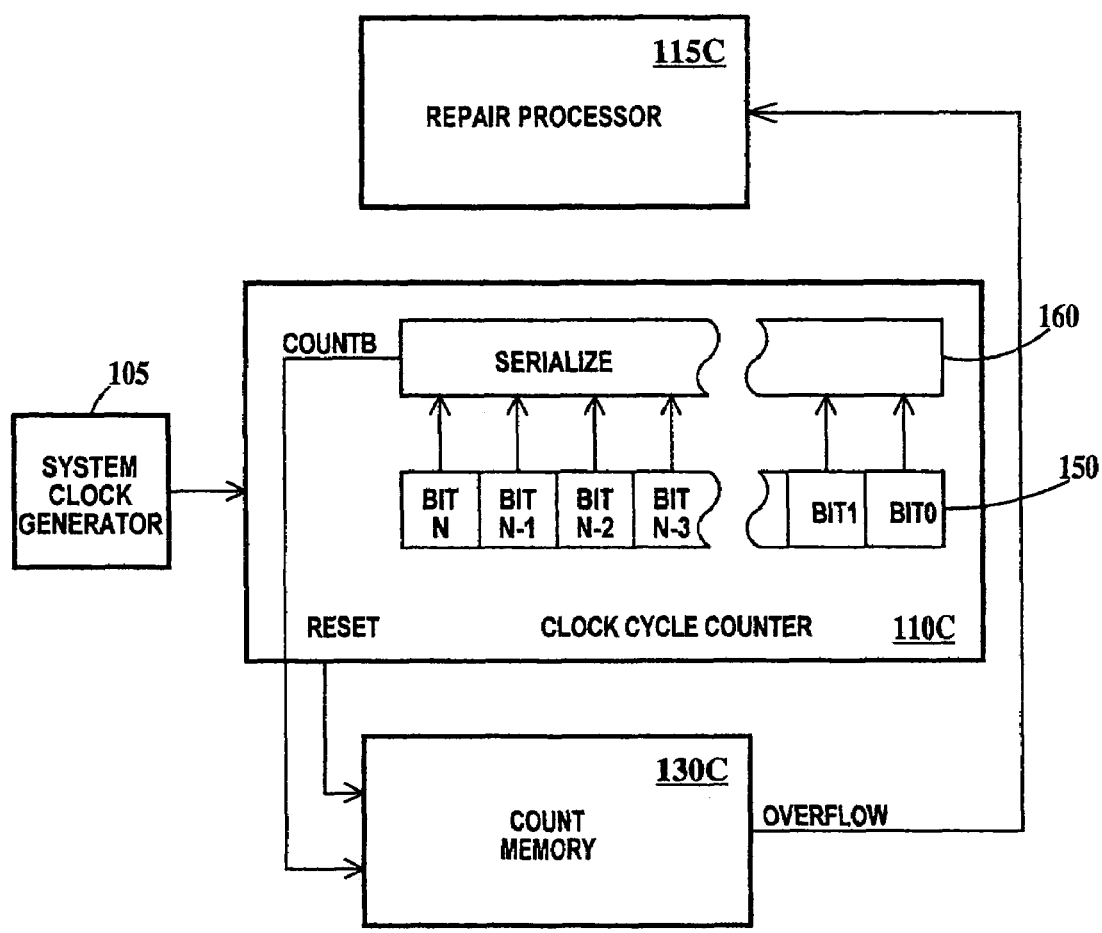
FIG. 5 is a diagram illustrating a third circuit implementation of the present invention.

FIG. 5 is a diagram illustrating a third circuit implementation of the present invention, excluding the circuits selected for redundancy coverage and their redundant counterparts. In FIG. 5, a counter 110C is similar to counter 110B of FIG. 4 except a serialization circuit 160 converts the entire contents of register 150 into a coded digital signal (COUNTB) that is connected to count memory 130. Count memory 130 can be adapted to generate an overflow signal OVERFLOW to a repair processor 115C in order to initiate a repair event.

Instead of using OVERFLOW to trigger a repair event, the M-bit COUNTA bus and attendant registers of FIG. 3 or serialized COUNTA bus and attendant registers of FIG. 4 may also be used.

Figure 6:
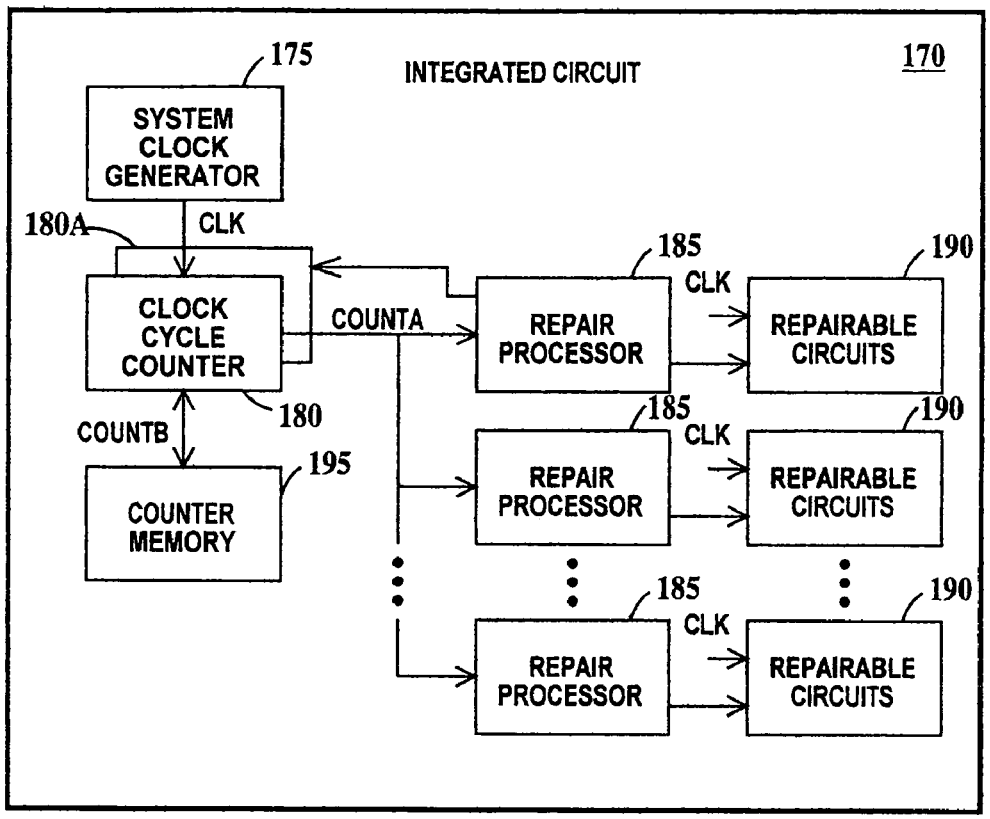
FIG. 6 is a schematic block diagram of an integrated circuit according to a third embodiment of the present invention

FIG. 6 is a schematic block diagram of an integrated circuit according to a third embodiment of the present invention. In FIG. 6, an integrated circuit chip 170 includes a system clock generator 175, a clock cycle counter 180, a redundant clock cycle counter 180A, a multiple repair processors 185 and corresponding repairable circuits 190, each repairable circuit including an original circuit and one or more replacement circuits. Additionally, integrated circuit 170 may include an on-chip count memory 195 for storing the cumulated number of clocks counted by clock cycle counter 180, or an off-chip memory may be use for this purpose. In the third embodiment of the present invention, a single clock cycle counter 180 serves multiple repair processors 185. However, since the number of clock cycles required to trigger a replacement event can vary among repair processors 185, there is no RESET signal and a means for each repair processor 185 to determine when to trigger a repair event must be included within each repair processor.

Figure 7:
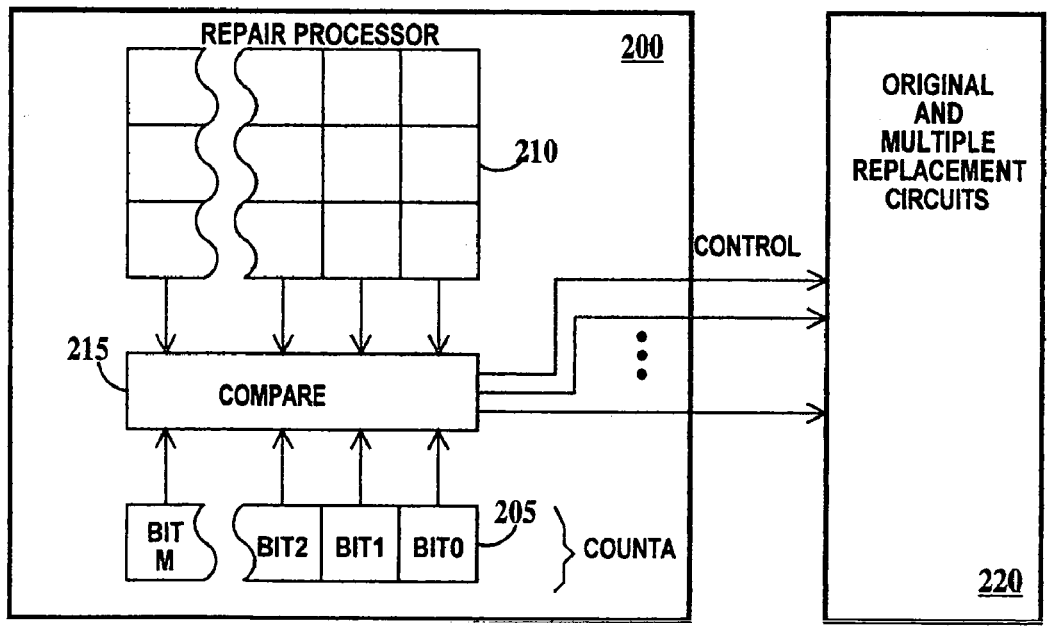
FIG. 7 is a diagram illustrating a fourth circuit implementation of the present invention.

FIG. 7 shows a fourth circuit implementation of the present invention, wherein multiple repair processors are triggered by different clock cycle counts and multiple times to effect multiple repairs. In FIG. 7, repair processor 200 includes a register 205 for receiving an M-bit COUNTA signal as described supra. Repair processor 200 is also provided with a memory 210 which may be an FPGA or a fuse bank that stores sets of bits corresponding to one or more clock cycle counts on which a repair event should occur. A comparator 215 compares the contents of register 205 with all the sets of data bits stored in memory 210 and triggers the appropriate control signals to replacement circuits 220.

Figure 8:
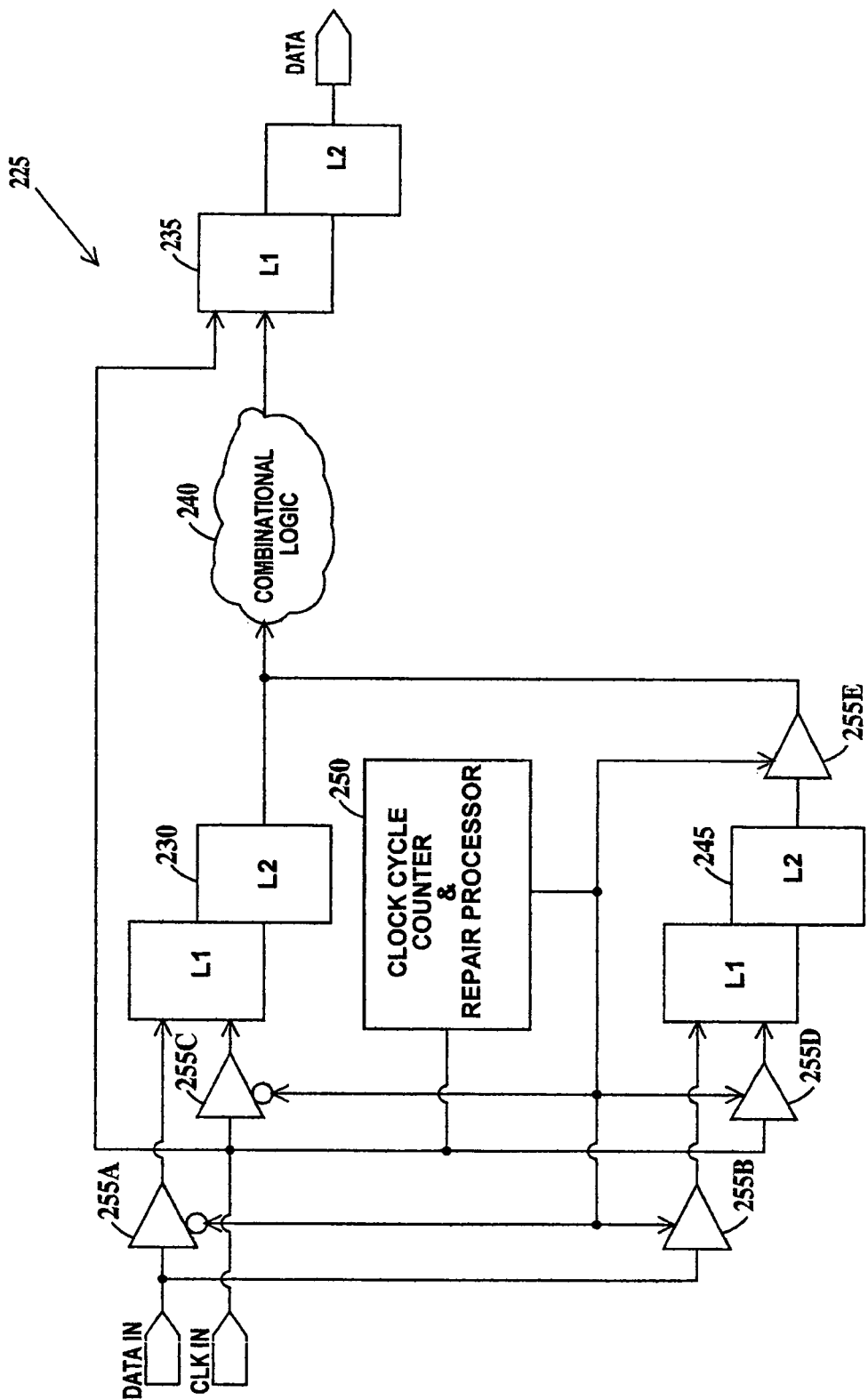
FIG. 8 is a schematic diagram of a first exemplary circuit utilizing the present invention.

FIG. 8 is a schematic diagram of a first exemplary circuit utilizing the present invention. In FIG. 8, a redundant latch circuit 225 includes a sending latch 230 connected to a receiving latch 235 through combinatorial logic 240, a redundant latch 245, a clock cycle counter and repair processor 250 and multiple tristate buffers 255A, 255B, 255C, 255D and 255E. Clock cycle counter and repair processor 250 may include one or more redundant clock cycle counters. Tristate buffer is 255A is inserted in the DATA path between DATA IN and sending latch 230 and tristate buffer 255C is inserted in the CLK path between CLK IN and sending latch 230. Tristate buffer is 255B is inserted in the DATA path between DATA IN and redundant latch 245 and tristate buffer 255D is inserted in the CLK path between CLK IN and redundant latch 245. Tristate buffer 255E is inserted in the data path between redundant latch 255E and combinational logic 240.

Depending on the number of elapsed clock cycles, clock cycle counter and repair processor 250 generates a CONTROL signal that either turns on tristate buffers 255A and 255C in order to pass DATA and CLK signals respectively to sending latch 230 and turns off tristate buffers 255B, 255D and 255E or turns on tristate buffers 255B and 255D in order to pass DATA and CLK signals respectively to redundant latch 245 and connect redundant latch 245 to combinational logic 240 and turns off tristate buffers 255A and 255C. Tristate buffers 255A, 255B, 255C, 255D and 255E may be replaced by 2:1 multiplexers.

Figure 9:
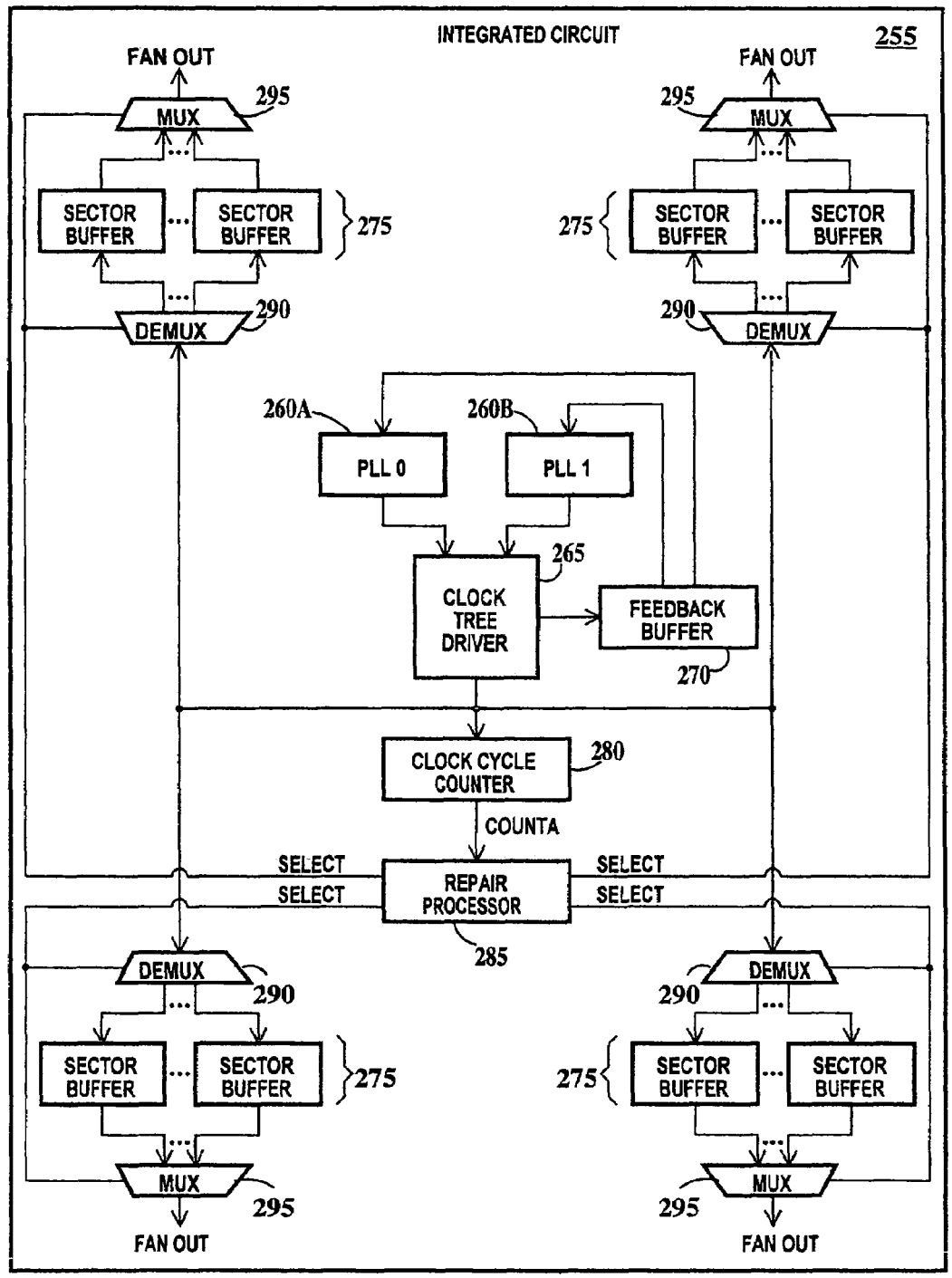
FIG. 9 is a schematic diagram of a second exemplary circuit utilizing the present invention.

FIG. 9 is a schematic diagram of a second exemplary circuit utilizing the present invention. In FIG. 9, an integrated circuit 255 includes a first PLL circuit 260A and a second PLL circuit 260B, each designed to generate clocks of different frequencies, a central clock tree driver 265, a feedback buffer 270 designed to emulate the silicon and wire delay through a complete path in the tree, and four of sector buffer sets 275 used to drive the system clock through more local areas of the chip. Integrated circuit 255 further includes a clock cycle counter 280, a repair processor 285, four de-multiplexers 290 and four multiplexers 295 in order to implement sector buffer replacement. Clock cycle counter 280 may include redundant clock cycle counters. There is one de-multiplexer 290 and one multiplexer 295 associated with each sector buffer set 275. Each multiplexer 295 feeds a fan out to drive multiple local clock regenerators (not shown).

PLL circuits 260A and 260B are selectable to drive clock tree driver 265. Feedback circuit 270 allows the PLL circuits to matches the RC and silicon delay of the clock tree. Clock tree driver 265 provides a CLK signal to each de-multiplexer 290 and to clock cycle counter 280. Clock cycle counter 280 supplies a COUNTA signal to repair processor 285, which in turn provides SELECT signals to de-multiplexers 290 and multiplexers 295. The SELECT signal "switches" out an "old" sector buffer and switches in a "new" sector buffer. Clock cycle counter 280 and repair processor 285 may be implemented by any of the methods described supra.

Figure 10:
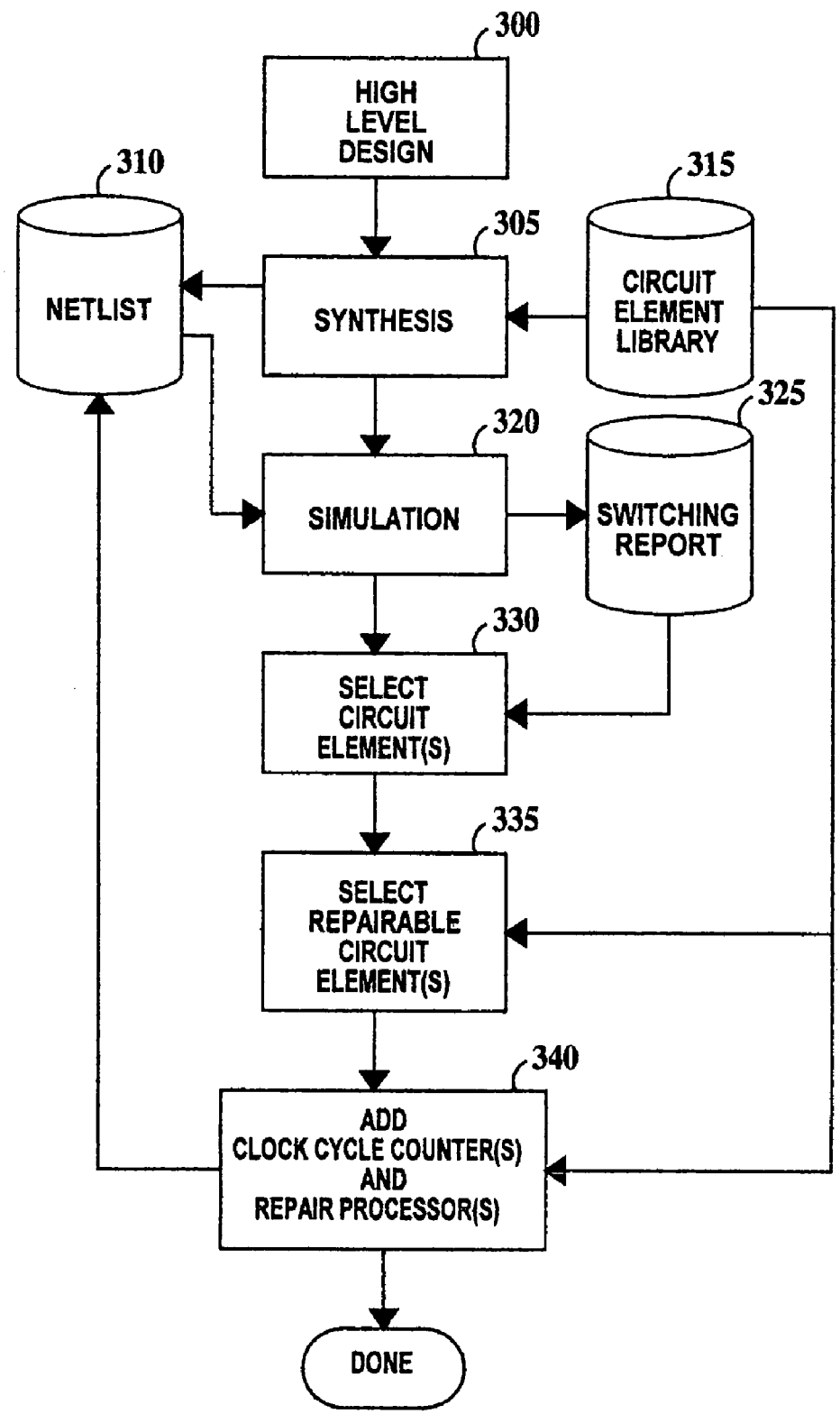
FIG. 10 is a flowchart illustrating a method of designing an integrated circuit according to the present invention.

FIG. 10 is a flowchart illustrating a method of designing an integrated circuit according to the present invention. In step 300, a high level design (HLD) of the integrated circuit is completed. In step 305, design synthesis is performed in order to generate a netlist 310 of the HLD from a library 315 of circuit elements. In step 320 simulation of the netlist design is performed. As part of the simulation, a switching report 325 is generated. Switching report 325 lists the total number of state toggles (input and/or output signal level changes) each circuit element made during the simulation.

In step 330, switching report 325 is used to select potential circuit elements that could potentially "wear out" based on the switching factor or transition density of each circuit element as reported in switching report 325, a predetermined degradation rate per transition, a power on time specification and an acceptable degradation specification. The degradation rate may be a function of the voltage level switched by the circuit element and may be process technology dependent.

In step 335, repairable circuit elements having the same function as the circuit elements selected in step 330 but including AND/OR legs, are selected from design library 315. The repairable elements may have N sets of AND/OR legs in order that multiple "repairs" can be performed. In step 340, the automatic synthesis tool adds one or more clock cycle counter and one or more repair processors, which are selected from design library 315. The automated synthesis tool adds structures that connect the clock cycle counters, repair processors and repairable circuit elements in a method similar to the method used to building clock tree structures.

Figure 11:
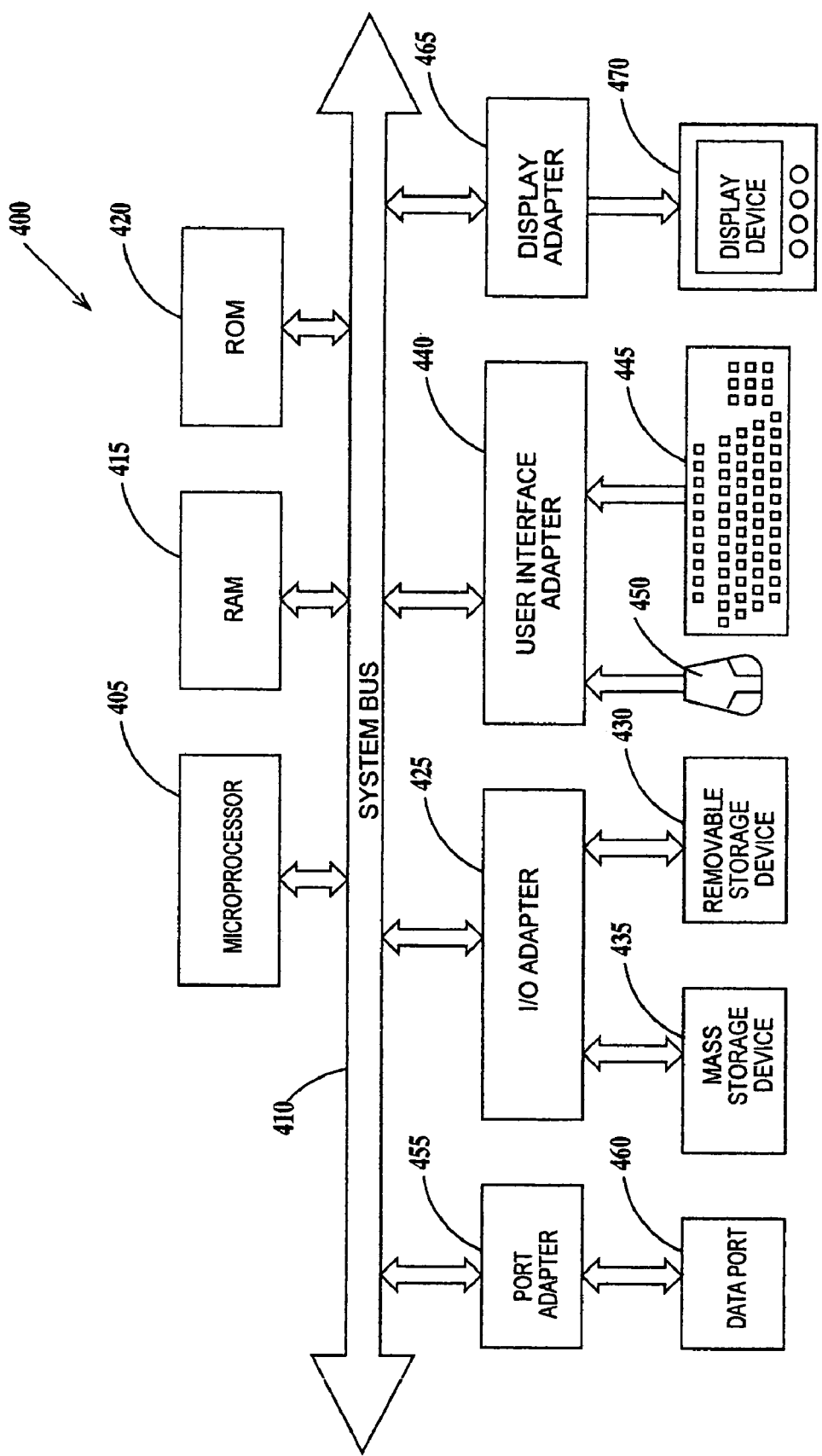
FIG. 11 is a schematic block diagram of a general-purpose computer for practicing the present invention.

Generally, the method described herein with respect to designing an integrated circuit having a digital reliability monitor having autonomic repair and notification capability is practiced with a general-purpose computer and the method may be coded as a set of instructions on removable or hard media for use by the general-purpose computer. FIG. 11 is a schematic block diagram of a general-purpose computer for practicing the present invention. In FIG. 11, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one skilled in the art and stored on the system or a data and/or program storage device to simplify the practicing of this invention. In operation, information for the computer program created to run the present invention is loaded on the appropriate removable data and/or program storage device 430, fed through data port 460 or typed in using keyboard 445.

Thus, the present invention provides a method for mitigating the probability of early failures due to increased operating frequency.

The description of the embodiments of the present invention is given above for the understanding of the present invention. It is understood that the invention is not limited to the particular embodiments described herein, but is capable of various modifications, rearrangements and substitutions as will now become apparent to those skilled in the art without departing from the scope of the invention. For example, after a given number of clock cycles a voltage regulator could be replaced with another voltage regulator of a different output voltage than the replaced voltage regulator, or the original voltage regulator can be adjusted to output a different voltage level than before in order to compensation for wear-out of circuits supplied by the voltage regulator. Further, the signal being counted need not be a clock signal but any signal switching between two (or more) states. The system may have inherent features of being total autonomic, or smart-autonomic. As various units as described above are replaced, an overall autonomic counter may be employed to keep track of the "health of the system," providing a weighted output that will elicit additional smart-autonomic controls. For example, if a voltage regulator is operating on it's last replacement module, the smart-autonomic controller may reduce the input voltage to the regulator thus placing it on a longer, or indefinite lifetime curve. The smart-autonomic controller may also send console messages, or log this event for a field repair to occur. The smart-autonomic controller may also, for example, replace a last failing unit (e.g. a system clock) with one that is optimized to operate at a reduced frequency, and is known as in the case of the voltage regulator to have an infinite lifetime curve. Such interventions are easily integrated with technology alterations, in the case of the clock example by having an infinite lifetime clock designed at a gate length that is known reliable. In this case the unit would suffer frequency degradation, but as in the case of the voltage regulator, a console message or log can alert filed service to replace the entire unit. Therefore, it is intended that the following claims cover all such modifications and changes as fall within the true spirit and scope of the invention.

What is claimed is:

1. An integrated circuit, comprising:
   a pulse generator coupled to a cycle counter;
   one or more repairable circuit elements;
   a repair processor coupled to said cycle counter and adapted to repair a repairable circuit element of said one or more repairable circuit elements before both (i) said repairable circuit element fails and (ii) when said cycle counter reaches a pre-determined cycle count of pulses generated by said pulse generator; and
   a memory circuit adapted to store a cycle count of a number of cycles counted since an initial power up and to resume counting from said stored cycle count after a power down/power up cycle of said integrated circuit.

2. The integrated circuit of claim 1, wherein said repair processor is adapted to permanently disable said repairable circuit element and replace said repairable circuit element with a redundant circuit element having the same function as said repairable circuit element.

3. The integrated circuit of claim 1, wherein said pulses comprise a clock signal and said repairable circuit element is responsive to said clock signal.

4. The integrated circuit of claim 1, wherein:
   said cycle counter is adapted to generate a trigger signal when said predetermined cycle count is reached; and said repair processor is adapted to receive said trigger signal and affect a repair of said repairable circuit element when said trigger signal is received.

5. The integrated circuit of claim 4, wherein said trigger signal comprises a subset of a set of bits encoding a current cycle count of said cycle counter.

6. The integrated circuit of claim 1, wherein said repairable circuit element is selected from the group consisting of a digital circuit, an analog circuit, a memory circuit, a latch, a logic gate, a group of logic gates, an individual device, a transistor, a diode, a resistor, capacitor, an inductor and a wire.

7. The integrated circuit of claim 1, wherein selected gates of a field programmable gate array are used to implement said repairable circuit element, and said repair processor is adapted to program a replacement of said selected gates of said field programmable gate array with previously unused gates of said field programmable gate array.

8. The integrated circuit of claim 1, wherein said repair processor is adapted to perform multiple repairs by repairing previously repaired repairable circuit elements.

9. The integrated circuit of claim 1, wherein:
said cycle counter is adapted to generate a signal encoding what fraction of said predetermined cycle count is reached; and
said repair processor is adapted to receive said signal and affect a repair of said repairable circuit element when said fraction of said predetermined cycle count is 1.

10. The integrated circuit of claim 1, further including:
said cycle counter generating a signal encoding what fraction of said predetermined cycle count is reached; and
said repair processor receiving said signal and repairing said repairable circuit element when said signal encodes a fraction of 1.

11. An integrated circuit, comprising:
a pulse generator coupled to a cycle counter;
one or more repairable circuit elements;
a repair processor coupled to said cycle counter and adapted to repair a repairable circuit element of said one or more repairable circuit elements before both (i) said repairable circuit element fails and (ii) when said cycle counter reaches a pre-determined cycle count of pulses generated by said pulse generator;
a redundant cycle counter; and
wherein said repair processor is adapted to replace said cycle counter with said redundant cycle counter when said cycle counter reaches a fixed cycle count.

12. The integrated circuit of claim 11, wherein said repair processor is adapted to permanently disable said repairable circuit element and replace said repairable circuit element with a redundant circuit element having the same function as said repairable circuit element.

13. The integrated circuit of claim 11, wherein said pulses comprise a clock signal and said repairable circuit element is responsive to said clock signal.

14. The integrated circuit of claim 11, wherein:
said cycle counter is adapted to generate a trigger signal when said predetermined cycle count is reached; and
said repair processor is adapted to receive said trigger signal and affect a repair of said repairable circuit element when said trigger signal is received.

15. The integrated circuit of claim 14, wherein said trigger signal comprises a subset of a set of bits encoding a current cycle count of said cycle counter.

16. The integrated circuit of claim 11, wherein said repairable circuit element is selected from the group consisting of a digital circuit, an analog circuit, a memory circuit, a latch, a logic gate, a group of logic gates, an individual device, a transistor, a diode, a resistor, capacitor, an inductor and a wire.

17. The integrated circuit of claim 11, wherein selected gates of a field programmable gate array are used to implement said repairable circuit element, and said repair processor is adapted to program a replacement of said selected gates of said field programmable gate array with previously unused gates of said field programmable gate array.

18. The integrated circuit of claim 11, wherein said repair processor is adapted to perform multiple repairs by repairing previously repaired repairable circuit elements.

19. The integrated circuit of claim 11, wherein:
said cycle counter is adapted to generate a signal encoding what fraction of said predetermined cycle count is reached; and
said repair processor is adapted to receive said signal and affect a repair of said repairable circuit element when said fraction of said predetermined cycle count is 1.

20. The integrated circuit of claim 11, further including:
said cycle counter generating a signal encoding what fraction of said predetermined cycle count is reached; and
said repair processor receiving said signal and repairing said repairable circuit element when said signal encodes a fraction of 1.

21. A method of preemptively repairing an integrated circuit, comprising:
(a) providing a pulse generator for generating a pulsed signal;
(b) providing a cycle counter for counting cycles of said pulsed signal;
(c) providing one or more repairable circuit elements;
(d) providing a repair processor for repairing a repairable circuit element of said one or more repairable circuit elements when said cycle counter reaches a pre-determined cycle count;
(e) repairing said repairable circuit element before both (i) said repairable circuit element fails and (ii) when said cycle counter reaches said pre-determined cycle count; and
(f) storing a cycle count of a number of cycles counted since an initial power up in a memory circuit and resuming counting from said stored cycle count after a power down/power up cycle of said integrated circuit.

22. The method of claim 21, wherein said step (e) includes permanently disabling said repairable circuit element and replacing said repairable circuit element with a redundant circuit element having the same function as said repairable circuit element.

23. The method of claim 21, wherein said pulsed signal is a clock signal and said repairable circuit element is responsive to said clock signal.

24. The method of claim 21, further including:
said cycle counter generating a trigger signal when said predetermined cycle count is reached; and
said repair processor receiving said trigger signal and repairing said repairable circuit element when said trigger signal is received.

25. The method of claim 24, wherein said trigger signal comprises a subset of a set of bits encoding a current cycle count of said cycle counter.

26. The method of claim 21, wherein said repairable circuit element is selected from the group consisting of a digital circuit, an analog circuit, a memory circuit, a latch, a logic gate, a group of logic gates, an individual device, a transistor, a diode, a resistor, a capacitor, an inductor and a wire.

27. The method of claim 21, wherein selected gates of a field programmable gate array are used to implement said repairable circuit element, and said repair processor programs a replacement of said selected gates of said field programmable gate array with previously unused gates of said field programmable gate array.

28. The method of claim 21, further including said repair processor performing multiple repairs by repairing previously repaired repairable circuit elements.

29. A method of preemptively repairing an integrated circuit, comprising:
   (a) providing a pulse generator for generating a pulsed signal;
   (b) providing a cycle counter for counting cycles of said pulsed signal;
   (c) providing one or more repairable circuit elements;
   (d) providing a repair processor for repairing a repairable circuit element of said one or more repairable circuit elements when said cycle counter reaches a pre-determined cycle count;
   (e) repairing said repairable circuit element before both (i) said repairable circuit element fails and (ii) when said cycle counter reaches said pre-determined cycle count;
   (f) providing a redundant cycle counter; and
   (g) said repair processor automatically replacing said cycle counter with said redundant cycle counter when said cycle counter reaches a fixed cycle count.

30. The method of claim 29, wherein said step (e) includes permanently disabling said repairable element and replacing said repairable circuit element with a redundant circuit element having the same function as said repairable circuit element.

31. The method of claim 29, wherein said pulsed signal is a clock signal and said repairable circuit element is responsive to said clock signal.

32. The method of claim 29, further including:
   said cycle counter generating a trigger signal when said predetermined cycle count is reached; and
   said repair processor receiving said trigger signal and repairing said repairable circuit element when said trigger signal is received.

33. The method of claim 32, wherein said trigger signal comprises a subset of a set of bits encoding a current cycle count of said cycle counter.

34. The method of claim 29, wherein said repairable circuit element is selected from the group consisting of a digital circuit, an analog circuit, a memory circuit, a latch, a logic gate, a group of logic gates, an individual device, a transistor, a diode, a resistor, a capacitor, an inductor and a wire.

35. The method of claim 29, wherein selected gates of a field programmable gate array are used to implement said repairable circuit element, and said repair processor programs a replacement of said selected gates of said field programmable gate array with previously unused gates of said field programmable gate array.

36. The method of claim 29, further including said repair processor performing multiple repairs by repairing previously repaired repairable circuit elements.

\* \* \* \* \*